J. M. BONE.
Harrows.

No. 148,591. Patented March 17, 1874.

—SCALE.—

WITNESSES:
William A. Ragan
Benj. H. Stephens

INVENTOR:
James M. Bone,
per Chas. P. Housum,
Attorney.

UNITED STATES PATENT OFFICE.

JAMES M. BONE, OF MARROWBONE, ILLINOIS.

IMPROVEMENT IN HARROWS.

Specification forming part of Letters Patent No. 148,591, dated March 17, 1874; application filed January 18, 1873.

*To all whom it may concern:*

Be it known that I, JAMES M. BONE, of Marrowbone, in the county of Moultrie and State of Illinois, have invented certain Improvements in Harrows, of which the following is a specification:

My invention relates to an improvement in harrows; and consists in the construction of the frame of the machine, so as to adapt itself horizontally to the inequalities of the ground.

Figure 1:
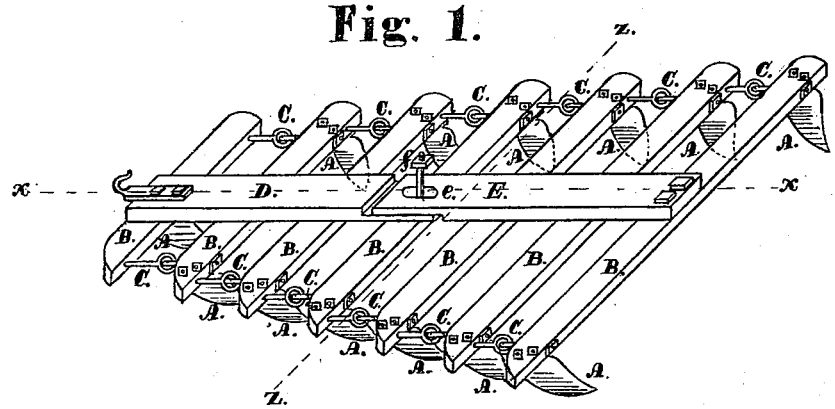
Figure 2:
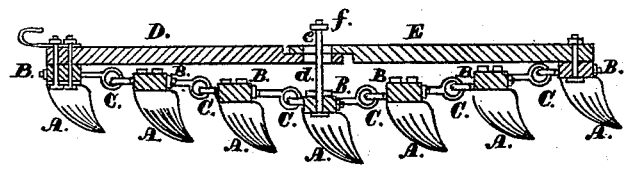
Figure 3:
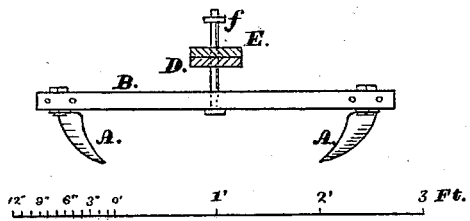

Figure 1 is a perspective view of a harrow embodying my invention; Fig. 2, a longitudinal vertical section of the same on the dotted lines $x\ x$, Fig. 1; and Fig. 3, a transverse vertical section on the dotted lines $z\ z$, Fig. 1.

A represents the cutters or shovels, which are so formed that they shall curve backward and inward. B B are transverse bars, to which the cutters or shovels are secured with bolts, and set at an angle of about ten degrees on a line, as shown at $x\ x$ in Fig. 1. The transverse bars are secured together with hook and eye bolts, C C. D is a longitudinal bar secured to the front transverse bar of the machine, and E a longitudinal bar secured to the rear transverse bar of the machine. In the center the bars D and E are rabbeted together. A bolt, $f$, passes through oblong slots, $d\ e$, in said bars, and is secured to the center one of the transverse bars of the machine.

This arrangement allows of a horizontal adjustment of the transverse bars to which the shovels or cutters are attached, and the cutters or shovels curving backward cut through or pass over obstructions, and will not clog with trash, and curving inward tend to keep the machine steady.

I claim as my invention—

The combination of the bars B B, hook and eye bolts C C, bars D E, slots $d\ e$, bolt $f$, and cutters or shovels A A, all as shown and described, and for the purpose set forth.

JAMES M. BONE.

Witnesses:
CHARLES P. HOUSUM,
PATRICK GRAHAM.